United States Patent
Pielasch et al.

(10) Patent No.: US 10,414,853 B2
(45) Date of Patent: Sep. 17, 2019

(54) METHOD OF MANUFACTURING OF PRESS MATERIALS

(71) Applicant: Covestro Deutschland AG, Leverkusen (DE)

(72) Inventors: Andreas Pielasch, Bergisch-Gladbach (DE); Dirk Steinmeister, Leverkusen (DE); Stephan Schleiermacher, Pulheim (DE); Henry Gu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 236 days.

(21) Appl. No.: 15/304,553

(22) PCT Filed: Apr. 15, 2015

(86) PCT No.: PCT/EP2015/058118
§ 371 (c)(1),
(2) Date: Oct. 17, 2016

(87) PCT Pub. No.: WO2015/158744
PCT Pub. Date: Oct. 22, 2015

(65) Prior Publication Data
US 2017/0037180 A1 Feb. 9, 2017

(30) Foreign Application Priority Data
Apr. 17, 2014 (EP) .................................... 14165095

(51) Int. Cl.
| | |
|---|---|
| *C08G 18/76* | (2006.01) |
| *C08G 18/48* | (2006.01) |
| *C08G 18/64* | (2006.01) |
| *C08L 97/02* | (2006.01) |
| *B29C 65/48* | (2006.01) |
| *C08G 18/61* | (2006.01) |
| *B29K 75/00* | (2006.01) |

(52) U.S. Cl.
CPC .......... *C08G 18/7671* (2013.01); *B29C 65/48* (2013.01); *C08G 18/48* (2013.01); *C08G 18/4837* (2013.01); *C08G 18/61* (2013.01); *C08G 18/6492* (2013.01); *C08G 18/7664* (2013.01); *C08L 97/02* (2013.01); *B29K 2075/00* (2013.01)

(58) Field of Classification Search
CPC ............................ C08G 18/6492; C08L 97/02
See application file for complete search history.

(56) References Cited

U.S. PATENT DOCUMENTS

| | | | | |
|---|---|---|---|---|
| 4,260,532 A | * | 4/1981 | Reuther ................ | C07C 263/18 524/197 |
| 4,480,070 A | * | 10/1984 | Bosscher ............. | C08G 18/283 524/591 |
| 4,546,039 A | * | 10/1985 | Horacek ................ | C08G 18/10 156/331.4 |
| 4,608,407 A | * | 8/1986 | Kerimis .................. | C08L 97/02 524/14 |
| 4,692,292 A | | 9/1987 | Kollmeier et al. | |
| 4,751,251 A | | 6/1988 | Thornsberry | |
| 6,881,771 B2 | * | 4/2005 | Haas ....................... | C08G 18/10 264/109 |
| 8,394,303 B2 | | 3/2013 | Lempfer | |
| 2003/0212227 A1 | * | 11/2003 | Stroobants ............. | C08G 18/10 527/301 |
| 2010/0168287 A1 | * | 7/2010 | Moriarty ............. | B29C 43/3642 524/35 |
| 2011/0082233 A1 | * | 4/2011 | SenGupta .......... | C08G 18/0876 523/142 |

FOREIGN PATENT DOCUMENTS

| | | |
|---|---|---|
| DE | 3328662 A1 | 2/1985 |
| DE | 10141209 A1 | 3/2003 |
| DE | 10242770 A1 | 3/2004 |
| EP | 0207192 A1 | 1/1987 |
| EP | 1330481 A1 | 7/2003 |
| EP | 2315652 A1 | 5/2011 |
| WO | WO-0234811 A1 | 5/2002 |
| WO | WO-03018659 A1 | 3/2003 |
| WO | WO-2008144770 A1 | 11/2008 |
| WO | WO-2010022864 A1 | 3/2010 |

OTHER PUBLICATIONS

Ashland. PVP—Polyvinylpyrrolidone polymers. Asland Specialties Ingredients. Available at https://www.brenntag.com/media/documents/bsi/product_data_sheets/material_science/ashland_polymers/pvp_polymers_brochure.pdf. (Year: 2013).*
Sigma-Aldrich K15. Polyvinylpyrrolidone K15 Product page. Available at https://www.sigmaaldrich.com/catalog/product/sial/81390?lang=en&region=US. (Year: 2019).*
Sigma-Aldrich K90. Polyvinylpyrrolidone K90 Product page. Available at https://www.sigmaaldrich.com/catalog/product/sial/81438?lang=en&region=US. (Year: 2019).*
International Search Report for PCT/EP2015/058118 dated Jun. 10, 2015.

\* cited by examiner

*Primary Examiner* — Michael M Dollinger
(74) *Attorney, Agent, or Firm* — Drinker Biddle & Reath LLP

(57) ABSTRACT

The invention relates to a polyurethane-polyurea binder which contains specific silicones or polyvinyl pyrrolidones and which is suitable for the manufacture of press materials from organic and/or inorganic materials, to the corresponding use of said binders and to the press materials manufactured using the specific binders.

5 Claims, No Drawings

METHOD OF MANUFACTURING OF PRESS MATERIALS

CROSS-REFERENCE TO RELATED APPLICATIONS

This application is a national stage application (under 35 U.S.C. § 371) of PCT/EP2015/058118, filed Apr. 15, 2015, which claims benefit of European Application No. 14165095.2, filed Apr. 17, 2014, both of which are incorporated herein by reference in their entirety.

The invention relates to a polyurethane-polyurea-based binder which is suitable for the production of press materials made of organic and/or inorganic materials, the corresponding use of these binders, and also the press materials produced with these specific binders.

BACKGROUND OF THE INVENTION

Important binders used in the production of these press materials made of organic (e.g. lignocelluloses-containing) or inorganic (e.g. glass-wool-containing) materials are binders based on polyisocyanates of the diphenylmethane group (PMDI). These materials have inter alia significant involvement as wood fiber insulation board in the construction sector.

PMDI-bonded wood fiber insulation board (also termed "WFIB" below) achieves thermal conductivity values around 40 mW/(m*K). It therefore provides insulation comparable with that provided by the insulation materials glass wool and mineral wool.

The method usually used in the prior art to produce rigid WFIB wets wood fibers with PMDI binders, compacts the mixture, and hardens same by exposure to steam. This process is described by way of example in DE 10242770 A1. Flexible wood fiber insulation board can be produced by using what are known as bicomponent fibers. By way of example, WFIB is produced by the process described in EP 2315652 A in densities of about 50 kg/m$^3$ to 100 kg/m$^3$ with a very soft fiber-mat-like structure. However, these fibers cannot be used to produce a rigid insulation board—as produced with PMDI binders.

PMDI binders currently used for WFIB are straight PMDI, prepolymers, and fresh mixtures based on PMDI and polyol.

EP 1 330 481 A discloses binder mixtures based on polyisocyanate prepolymers made of PMDI and of polyoxyalkyleneols having at least 15% (preferably from 50 to 100%) content of oxyethylene structural units, and states that these have the advantage that the wood fibers used can have hither residual moisture content, and that nevertheless products with good dimensional stability are still obtained.

DE 101 41 209 A1 discloses binders based on prepolymers comprising urethane groups, obtainable via reaction of polyisocyanates of the diphenylmethane diisocyanate group with hydroxy-functional polyethers having more than 60% by weight ethylene oxide (EC)) content, based on the total quantity of alkylene oxides used for the production of the polyethers. A considerable improvement in cold adhesive bond strength during processing is stated as advantage.

DE 3 328 662 A1 discloses a process for the production of press materials, preferably particle board, via hot pressing of raw materials mixed with polyisocyanates as binder with concomitant use of catalysts which can be activated by heat and which are based on ammonium salts. It is said that these can by way of example be dissolved in aqueous polyisocyanate emulsions of the type obtained with addition of emulsifiers such as polyvinylpyrrolidone. Addition of the catalysts, which are latent at room temperature, can control the production process.

BRIEF SUMMARY OF THE INVENTION

Demand for timber is increasing sharply, and there is therefore increasing pressure to reduce usage of wood fibers. However, if the fiber content per volume of a conventional press material is reduced and the relative quantity of binder is kept constant the press material rapidly loses its internal coherence. In extreme cases, weakening of the material creates difficulties during transport and during installation at the construction site, and impairs the strength of the material after installation. Important quantitative criteria for describing weakening of WEB are tensile strength and compressive strength.

It is therefore desirable to provide a PMDI-based binder which gives, within a particular level of density, strong press materials with significantly better compressive strength values and tensile strength values in comparison with standard binder, while retaining a good, low thermal conductivity value. In other words, it is desirable to provide binders which give wood fiber insulation board with strength values of the type that can be achieved with standard binders only with higher density.

Surprisingly, it has now been found possible to produce wood fiber insulation board with good properties of the material, e.g. tensile strength or compressive stress, when binders are used which are obtainable via reaction of polyisocyanates of the diphenylmethane diisocyanate group with hydroxy-functional polyethers having more than 18% by weight, preferably more than 70% by weight, and particularly preferably more than 90% by weight, ethylene oxide (EC)) content, based on the total quantity of alkylene oxides used for the production of the polyethers, where the binders moreover comprise at least one compound A selected from the group of the compounds consisting of polyvinylpyrrolidones with weight-average molar mass at least 1000 g/mol and silicones with weight-average molar mass greater than 1500 g/mol.

DETAILED DESCRIPTION OF THE INVENTION

The binders are produced by using polyisocyanates of the diphenylmethane diisocyanate group, e.g. polyphenyl polymethylene polyisocyanates of the type produced via aniline-formaldehyde condensation and subsequent phosgenation ("crude MDI"). It is preferable to use, as polyisocyanate component, isocyanates of the diphenylmethane diisocyanate group (PMDI types) having a relatively large number of rings. It is particularly preferable that these have less than 55% by weight content of monomeric diphenylmethane diisocyanate.

The polyurethane-polyureas are obtained via reaction of the polyisocyanates with hydroxy-functional polyethers having more than 18% by weight, preferably more than 70% by weight, and particularly preferably more than 90% by weight, EO content, based on the total quantity of alkylene oxides used for the production of the polyethers. The hydroxy-functional polyethers generally have from 1 to 8 OH groups, preferably from 2 to 6. Their number-average molar masses are preferably from 100 to 10 000 g/mol, particularly preferably from 150 to 5000 g/mol. It is preferable to use polyoxypropylene polyoxyethylene polyols. Particular preference is given to polyoxyethylene polyols.

The hydroxy-functional polyethers can be produced by known processes, for example via anionic polymerization of alkylene oxides in the presence of starter compounds comprising active hydrogen atoms. Suitable alkylene oxides comprise from 2 to 4 carbon atoms in the alkylene moiety. Examples, alongside ethylene oxide are tetrahydrofuran, propylene 1,2-oxide, butylenes 1,2- and 2,3-oxide, and it is preferable to use ethylene oxide (EO) and propylene 1,2-oxide (PO). The alkylene oxides can be used in alternating succession or as mixtures.

Compounds used as starter compounds having active hydrogen atoms are preferably those whose number-average molar masses are from 18 to 2000 g/mol and which have from 1 to 8 hydroxy groups. Examples are ethylene glycol, diethylene glycol, triethylene glycol, propylene 1,2-glycol, 1,4-butanediol, hexamethylene glycol, bisphenol A, trimethylolpropane, glycerol, pentaerythritol, sorbitol, cane sugar, degraded starch, triethanolamine, ethylenediamine, toluenediamine, and water. Particular preference is given to ethylene glycol, diethylene glycol, and glycerol. It is also possible to use oligomeric alkoxylation products of the abovementioned low-molecular weight starters with number-average molar masses from 200 to 2000 g/mol as starter compounds.

The reaction of polyisocyanates and hydroxy-functional polyethers generally takes place at temperatures of from 15 to 120° C.

The reaction of the individual components can take place by way of a prepolymer reaction where the quantities used of the polyisocyanates and hydroxy-functional polyethers are preferably such that the NCO content of the resultant prepolymer is from 20 to 32% by weight, preferably from 21 to 28% by weight. However, it is also possible that mixing of the components is delayed until shortly before application to the organic and/or inorganic materials used for the production of the press materials (termed "gluing" below), or that they are applied individually or after mixing in any desired combination, so that the urethane reaction takes place entirely or to some extent after gluing.

The completion of the reaction of the binders to give the polyurethane-polyureas takes place during continuation of the process for producing the press materials via reaction with water/steam.

In the invention the binders comprise at least one other compound A selected from one or more compounds of the group of the compounds consisting of A1) polyvinylpyrrolidones whose weight-average molar mass is at least 1000 g/mol and A2) silicones whose weight-average molar mass is greater than 1500 g/mol.

The silicones known for use in polyurethanes can be used as silicones (A2), and siloxane-polyoxyalkylene copolymers may be mentioned as preferred example. An overview of the production of, and nature of, the silicones used in polyurethanes is provided by Randall M. Hill in "Silicone Surfactants", CRC Press (1999). Examples of these silicones are also provided in U.S. Pat. No. 4,751,251 A. The weight-average molar mass of the silicones used in the binder of the invention is at least 1500 g/mol, preferably from 1500 g/mol to 25 000 g/mol, and in particular from 2000 g/mol to 15 000 g/mol. It is preferable that the silicones are siloxane-polyoxyalkylene copolymers having ≥20% ethylene oxide content whose weight-average molar mass is from 1500 g/mol to 25 000 g/mol, in particular siloxane-polyoxyalkylene copolymers having ≥20% by weight ethylene oxide content whose weight-average molar mass is from 2000 g/mol to 25 000 g/mol. In an embodiment to which preference is further given, the silicones are siloxane-polyoxyalkylene copolymers having ≥40% by weight ethylene oxide content whose weight-average molar mass is from 2000 g/mol to 15 000 g/mol.

The expression polyvinylpyrrolidones (A1) means for the purposes of this invention poly-N-vinylpyrrolidone or a derivative of poly-N-vinylpyrrolidone, or a copolymer of these compounds. The value of the weight-average molar mass of the polyvinylpyrrolidones is at least 1000 g/mol, preferably from 1500 g/mol to 20 000 g/mol, and very particularly preferably from 2500 to 15 000 g/mol.

The silicones and polyvinylpyrrolidones can be used individually or in combination. Proportions by mass that can be used are from 0.01 to 10, based on the total weight of the binder, particularly preferably from 0.1 to 3, based on the total weight of the binder.

The silicones and/or polyvinylpyrrolidones can be added to the isocyanate component, to the prepolymer, to the polyol component, or directly to the reaction mixture.

The binders of the invention can additionally comprise conventional additives and/or additional substances such as paraffins, blocked amines, montan waxes, internal release agents, and also flame retardants such as ammonium polyphosphate, and also condensation resins (urea-formaldehyde glues, melamine-urea-formaldehyde glues, melamine-urea-phenol-formaldehyde glues), and formaldehyde scavengers (for example ureas). It is preferable that these added to the binder mixture shortly before gluing. In a different embodiment it is also possible that they are added to the polyol components and/or to the PMDI.

Materials suitable for the production of the press materials are any of the lignocellulose-containing raw materials which can be adhesive-bonded with the binder of the invention, examples being wood, bark, cork, bagasse, straw, flax, bamboo, alfagrass, rice husks, sisal fibers, and coconut fibers, and also recyclates and raw materials based on plastics, for example rigid polyurethane foams, integral polyurethane foams, or other plastics, and also inorganic raw materials or recyclates, for example glass wool or rock wool. The substances suitable for adhesive bonding here can take the form of granulates, strands, chips, fibers, veneers, or flour, and can have by way of example from 0 to 35% by weight water content, preferably from 5 to 25% by weight. The process of the invention has particularly good suitability for the processing of lignocellulose-containing raw materials.

The press materials can be produced by the standard processes known to the person skilled in the art. From 1 to 100 parts by mass, preferably from 1.5 to 20 parts by mass, particularly preferably from 3.5 to 15 parts by mass, of binder are generally admixed with 100 parts by mass of the substances suitable for adhesive bonding, and the mixture is pressed with heat (e.g. at from 70° C. to 250° C.) and with pressure that is optionally up to 150 bar, to give boards or moldings.

In preferred embodiments the production of the binder system of the invention uses hydroxy-functional polyethers with more than 70% by weight EO content and siloxane-polyoxyalkylene copolymers having more than 20% by weight ethylene oxide content whose weight-average molar mass is from 1500 g/mol to 25 000 g/mol, or hydroxy-functional polyethers with more than 90% by weight EO content and siloxane-polyoxyalkylene copolymers having ≥20% by weight ethylene oxide content whose weight-average molar mass is from 1500 g/mol to 25 000 g/mol. In embodiments to which preference is further given, production of the binder system of the invention uses hydroxy-functional polyethers having more than 70% by weight EO content and polyvinylpyrrolidones of from 1500 g/mol to 20 000 g/mol, or hydroxy-functional polyethers having more than 90% by weight EO content and polyvinylpyrrolidones of from 1500 g/mol to 20 000 g/mol.

Examples

A. Raw Materials

Gutex Thermofiber®: Commercially available wood fibers (GUTEX Holzfaserplattenwerk H. Henselmann GmbH+ Co KG)

Desmodur® 1520A31: Polymeric MDI, NCO % 31.5, dynamic viscosity 350 mPas at 25° C. (Bayer Material-Science AG)

L300 Polyether polyol with OHN 190, produced via polymerization of 86.59% of ethylene oxide and 0.52% of propylene oxide; started on 12.89% of 1,2-propanediol; dynamic viscosity 350 mPas at 25° C. (Bayer Material-Science AG)

TEGOSTAB® B 8681: Polydimethylsiloxane-polyoxyalkylene block copolymer (Evonik Industries, weight-average MM 630 g/mol, rel. proportion by weight of ethylene oxide ($^1$H-NMR): <1%)

TEGOSTAB® B 8421: Polydimethylsiloxane-polyoxyalkylene block copolymer (Evonik Industries, weight-average MM 11994 g/mol, rel. proportion by weight of ethylene oxide ($^1$H-NMR): 62.2%)

DC193: Polydimethylsiloxane-polyoxyalkylene block copolymer (Dow Corning, weight-average MM 5034 g/mol, rel. proportion by weight of ethylene oxide ($^1$H-NMR): >99%)

LK443E: Dibutyl maleate-N-vinyl-2-pyrrolidone copolymer in polypropylene glycol (Air Products Corp., weight-average MM 6148 g/mol)

The molar masses were determined by means of gel permeation chromatography,

B. Method for Several Experiments E1-E7

The residual moisture level of the wood fibers was determined. From this, the mass: of wood without moisture, termed "zero-moisture wood mass" below, was calculated. Wood fibers with residual moisture are termed "air-dry wood fibers" below.

The ingoing weight of the binders related to the zero-moisture wood mass. Before an experiment began, the necessary binder was mixed manually from the raw material components listed in the table.

The air-dry wood fibers were wetted with the respective binder in a plowshare mixer via two-fluid nozzles. In each case, gluing of the wood fibers continued for 25 s. The wetted wood fibers were distributed to give a fiber cake in the rectangular lower mold half by a method analogous with DE10242770B4. The mold was closed by a convex cover in such a way that the bed of wetted wood fiber was compressed to the density desired for the board. Base and cover were permeable to steam. The binder in the compressed wood fiber bed was heated by steam, which flowed vertically through the entire thickness of the board, until the targeted temperature range from 90° C. to 94° C. had been reached. Once the targeted temperature range had been reached, the introduction of heat from steam was terminated. The wood fiber insulation board was removed after cooling, and dried to equilibrate moisture content.

C. Test Methods

Materials testing:

Measurement of compressive stress: EN 826

Measurement of tensile stress in accordance with EN 1607

Density: DIN 52182

Thermal conductivity value: DIN 52616

Gel permeation chromatography by a method based on DIN 55672-1: with tetrahydrofuran as eluent, flow rate 0.6 mL/min, injection of 100 µL, columns: crosslinked polystyrene-divinylbenzene, detection: refractive index, molar mass calibration: with narrowly distributed polystyrene standard; otherwise in agreement with DIN 55672-1.

TABLE 2

| Experiment | | E1* | E2 | E3* | E4* | E5 | E6 | E7 |
|---|---|---|---|---|---|---|---|---|
| Batch 1 of air-dry wood fibers | | 2.320 | 2.320 | | | | | |
| Batch 2 of air-dry wood fibers | | | | 2.282 | 2.282 | 2.282 | 2.282 | 2.282 |
| Binder mixture | | 0.215 | 0.215 | 0.254 | 0.254 | 0.254 | 0.254 | 0.254 |
| b) Binder mixture | | | | | | | | |
| Desmodur ® 1520A31 | | 0.166 | 0.165 | 0.195 | 0.193 | 0.193 | 0.193 | 0.193 |
| L300 | | 0.050 | 0.049 | 0.059 | 0.058 | 0.058 | 0.058 | 0.058 |
| Tegostab ® B 8681 | | | | | 0.0029 | | | |
| Tegostab ® B8421 | | | 0.0012 | | | 0.0029 | | |
| DABCO ® DC193 | | | | | | | 0.0029 | |
| LK-443E | | | | | | | | 0.0029 |
| c) Testing of material | | | | | | | | |
| Density | [kg/m$^3$] | 69 | 64 | 64 | 64 | 62 | 62 | 64 |
| Compressive stress | [kPa] | 17 | 20 | 32 | 38 | 45 | 45 | 50 |
| Tensile strength | [kPa] | 2.1 | 4.4 | | | | | |
| Thermal conductivity | [mW/(m * K)] | 39.3 | 39.5 | | | | | |
| Density of board for thermal conductivity | [kg/m$^3$] | 68 | 63 | | | | | |

*Comparative example

What is claimed is:

1. A polyurethane-polyurea-based binder system for the production of press materials, comprising a polyisocyanate comprising an isomer mixture and comprising a higher homologue of diphenylmethane diisocyanate and at least one hydroxy-functional polyether with more than 18% by weight ethylene oxide content, wherein
the binder system comprises at least one compound A selected from one or more compounds of the group consisting of
A1) poly-N-vinylpyrrolidone, a derivative of poly-N-vinylpyrrolidone, and a copolymer of N-vinylpyrrolidone with a weight-average molar mass of from at least 1000 g/mol to 15000 g/mol, and A2) silicones with weight-average molar mass greater than 1500 g/mol, and wherein the ethylene oxide content is at least 62.2% by weight.

2. The binder system as claimed in claim 1, wherein the weight-average molar mass of the compound A2) is from 1500 g/mol to 25 000 g/mol.

3. The binder system as claimed in claim 2, wherein the ethylene oxide content of the polyoxyethylene polyol is more than 70% by weight.

4. A process for the production for the press materials comprising applying the binder system as claimed in claim 2 to organic and/or inorganic materials and pressing the materials together.

5. A press material comprising the binder system as claimed in claim 2.

* * * * *